LUG FASTENING MEANS FOR ELECTRICAL SHIELDS

Filed Oct. 4, 1945

INVENTOR:
KURT EMDE
BY David M. Davis
Frank E. Mauritz
HIS ATTORNEYS

Patented Dec. 12, 1950

2,533,779

UNITED STATES PATENT OFFICE 2,533,779

LUG FASTENING MEANS FOR ELECTRICAL SHIELDS

Kurt Emde, Itasca, Ill., assignor to Zenith Radio Corporation, a corporation of Illinois Application October 4, 1945, Serial No. 620,298

3 Claims. (Cl. 174—35)

The present invention relates to fastening structures particularly useful in the assembly of radio apparatus.

In the mass production of radio apparatus, it is desirable that the assembly of elements into the radio apparatus be accomplished easily, inexpensively, in a foolproof manner, and with due regard to space requirements. This is particularly true in the assembling of the so-called "I. F. shield cans" on the chassis of a radio receiver.

It is an object of the present invention to provide an improved structure for fastening components of radio apparatus on the chassis of such apparatus.

A further object of the present invention is to provide inexpensive fastening apparatus for the so-called "I. F. shield cans" of a radio receiver wherein no additional components other than the radio chassis proper and the I. F. can itself are necessary, the cooperating fastening means on the can and chassis being integrally formed thereon.

Another object of the present invention is to provide an improved fastening structure wherein the cooperating fastening elements for a chassis and shield can are integrally formed therewith and are obtained by a simple mechanical operation, such as a punching operation.

A further object of the present invention is to provide an improved fastening structure for a shield can in a radio receiver wherein the fastening elements are all located in a convenient place above the upper surface of the radio chassis in a position of ready accessibility to, for example, a radio serviceman.

Still another object of the present invention is to provide a fastening arrangement for a shield can in a radio receiver wherein the shield can and its fastenings are above the surface of the radio chassis and do not extend below the surface of the chassis where space for connecting wires, etc., especially in small radio receivers, is at a premium.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawing, in which:

Figures 1, 2:
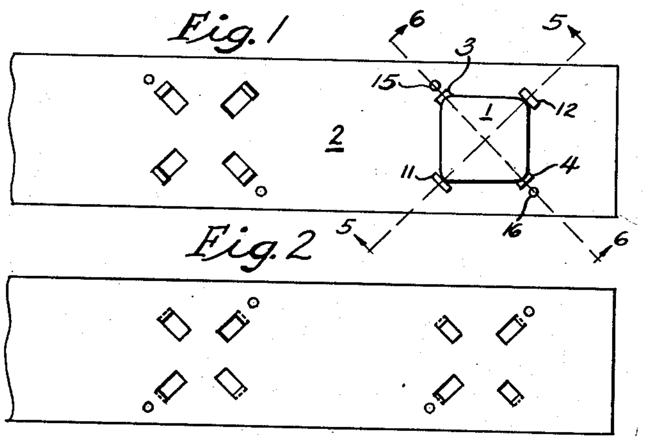
Figure 1 shows a plan view of apparatus incorporating the present invention.
Fig. 2 is a view in elevation of the under side of the apparatus shown in Fig. 1.
Figure 3:
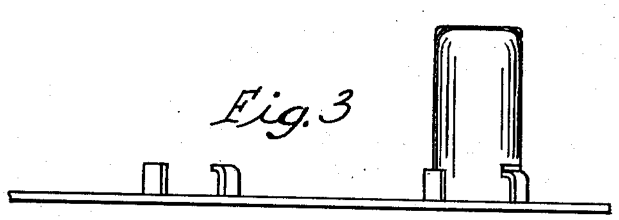
Fig. 3 is a view in side elevation of the apparatus shown in Fig. 1.
Figures 4, 5, 6, 7:
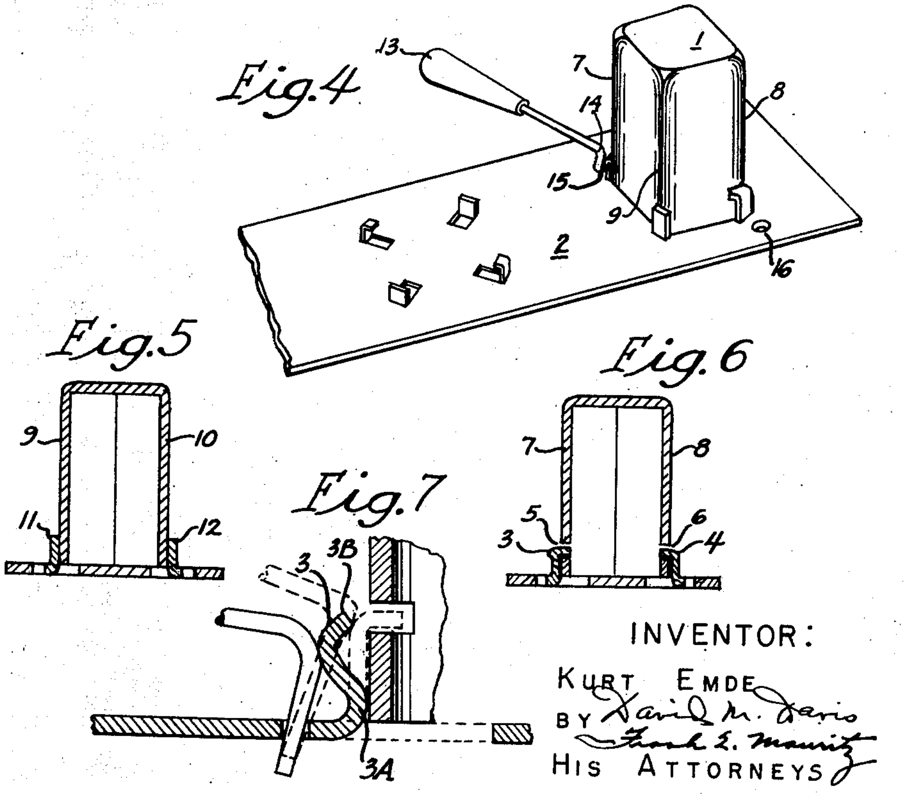
Fig. 4 is a view in perspective showing some of the apparatus shown in Fig. 1 and also a modified arrangement incorporating the present invention.
Fig. 5 is a sectional view taken substantially on line 5—5 of Fig. 1.
Fig. 6 is a sectional view taken substantially on line 6—6 of Fig. 1.

Fig. 7 indicates an operation performed to realize some features of the present invention.

Although the following description is applied specifically to fastening a shield can to the chassis of a radio receiver, it is obvious that the apparatus described and teachings included herein are applicable also in a general manner to the fastening together of other objects beside a chassis and a shield can.

The shield can 1 for shielding a transformer (not shown) in the intermediate frequency stage of a superheterodyne receiver is normally held after the assembly operation, described later, on the chassis 2 for such receiver by a pair of bent lugs 3, 4 formed integrally with and from the material originally forming a flat surface of the unfabricated chassis 2. The bent lugs 3, 4 have their free ends extending respectively into suitable openings 5, 6 in the diagonally opposite edges 7, 8 of the parallelepiped shaped shield can 1, the other diagonally opposite pair of edges 9, 10 abutting respectively the straight upstanding lugs 11, 12 which, as lugs 3 and 4, are originally punched from the chassis 2.

As fabricated, at least one of the lugs 3, 4 is positioned as shown in full lines in Fig. 7 to a point where an intermediate portion 3A on the lug serves to guide a can on the chassis but the free end 3B of the lug is sufficiently retracted out of the path of the can 1 when it is originally placed on the chassis in the first assembly operation.

The upstanding lugs 11, 12 are especially useful in the assembly operation during which the can 1 is placed on a chassis 2 with can edges 9, 10 engaging respectively the inner surfaces of the guide lugs 11, 12. After the can 1 is placed on the chassis, either lug 3 or 4 or both lugs 3, 4 are bent inwardly to a position where they positively engage the can wall edges defining, respectively, the apertures 5, 6. In actual assembly operation, one of the lugs 3, 4 may be positioned so that its free end is hooked into its cooperating opening in can 1 and then the other lug 3 or 4 may be bent inwardly as described above. Preferably, both the lugs 3, 4 are bent inwardly against can 1 to insure a good electrical contact between the metal shield can 1 and the metal chassis 2 and to prevent relative movement therebetween when the receiver is in transit, for example when the receiver is mounted in an automobile.

In the assembly operation the lugs 3, 4 may be conveniently bent into final holding position by a tool 13 having a bent portion 14 arranged to enter openings 15, 16, respectively, immediately back of bent lugs 3, 4. In such case, the end 14 of the tool 13 is placed in one of the openings 15, 16, as shown in Fig. 4, and then the handle end of the tool is moved upwardly to cause engagement with and movement of the associated lug into cooperating engagement in the opening 5 or 6, as the case may be. The holes 15 and 16, as well as the lugs 3, 4, 11 and 12, may all be punched out of the chassis sheet material. Also, of course, the apertures 5, 6 in the shield can 1 may be obtained by a punching operation, in which case all of the cooperating fastening elements are obtained by a relatively inexpensive method.

It is seen from the structure thus far described that the fastening elements for the shield can are on the outside surface of the chassis in a position of easy accessibility for a radio serviceman, who may easily remove the shield can by bending back one or more of the bent lugs 3, 4 by the use of a pair of pliers or other suitable tool. It is noted also that the structure thus far described is all on the outside of the receiver chassis and does not extend below the chassis, where space necessary to place the various connecting wires, etc., is at a premium, especially in small radio receivers.

It will appear obvious that means other than the particular tool 13 may be used, for example a clamping device (not shown) similar to a pair of pliers may be used to bend the bent lugs 3 and 4 toward one another to clamp the shield can in place. In such case, holes 15 and 16 are no longer necessary and are thus not shown in the modified arrangement shown in the left in Fig. 4.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination: a metallic radio chassis; a metallic shield-can having at least a first longitudinal edge, and a second longitudinal edge with an aperture formed therein; an integral, upstanding, guide-lug formed in said chassis adjacent said first edge in positive electrical and mechanical contact therewith; and an integral, upstanding, S-shaped, fastening-lug formed in said chassis having a lower portion adjacent said second edge in positive electrical and mechanical contact therewith, and having an upper portion extending into said aperture and de-formed to engage a portion of said can defining said aperture in positive electrical and mechanical contact.

2. In combination: a metallic radio chassis; a metallic shield-can having a plurality of longitudinal edges with apertures formed in at least some of said edges; a plurality of integral, upstanding, guide-lugs formed in said chassis adjacent a first group of said edges in positive electrical and mechanical contact therewith; and a plurality of integral, upstanding, S-shaped, fastening-lugs formed in said chassis having respective lower portions adjacent a second group of said edges in positive electrical and mechanical contact therewith, and having respective upper portions extending into said apertures and de-formed to engage portions of said can defining said apertures in positive electrical and mechanical contact.

3. In combination: a metallic radio chassis; a metallic shield-can having a first pair of longitudinal edges and having a second pair of longitudinal edges with apertures formed therein; a pair of integral, upstanding, guide-lugs formed in said chassis adjacent said first pair of edges in positive electrical and mechanical contact therewith; and a pair of integral, upstanding, S-shaped, fastening-lugs formed in said chassis having respective lower portions adjacent said second pair of edges in positive electrical and mechanical contact therewith, and having respective upper portions extending into said apertures and de-formed to engage portions of said can defining said apertures in positive electrical and mechanical ccontact.

KURT EMDE.

REFERENCES CITED

The following references are of record in the file of this patent:

UNITED STATES PATENTS

| Number | Name | Date |
|---|---|---|
| 1,078,181 | White | Nov. 11, 1913 |
| 1,219,468 | Kossoy | Mar. 20, 1917 |
| 1,697,317 | Kyle | Jan. 1, 1929 |
| 1,837,962 | Hensgen | Dec. 22, 1931 |
| 2,124,541 | Cassey | July 26, 1938 |
| 2,299,676 | Austin, Jr. | Oct. 20, 1942 |

FOREIGN PATENTS

| Number | Country | Date |
|---|---|---|
| 547,122 | Germany | Mar. 19, 1932 |